(12) United States Patent
Arakawa et al.

(10) Patent No.: US 6,201,783 B1
(45) Date of Patent: Mar. 13, 2001

(54) OPTICAL RECORDING MEDIUM HAVING SUBSTRATE OF DUAL TRANSPARENT LAYERS

(75) Inventors: Nobuyuki Arakawa; Masanobu Yamamoto, both of Kanagawa; Toshiyuki Kashiwagi; Yuji Akiyama, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/325,460

(22) Filed: Jun. 3, 1999

(30) Foreign Application Priority Data

Jun. 19, 1998 (JP) .................................................. 10-173051

(51) Int. Cl.7 ....................................................... G11B 7/24
(52) U.S. Cl. ...................................... 369/275.1; 428/64.4
(58) Field of Search ............................... 369/275.5, 275.1, 369/275.2, 283, 281, 280, 286; 428/64.4, 64.1; 430/320, 321

(56) References Cited

U.S. PATENT DOCUMENTS

| 4,622,261 | 11/1986 | Ochiai | 428/195 |
| 4,893,297 | 1/1990 | Gregg | 369/275 |
| 5,197,060 | * 3/1993 | Yatake | 369/283 |
| 5,538,774 | 7/1996 | Landin et al. | 428/64.1 |

FOREIGN PATENT DOCUMENTS

| 0227981 A2 | 7/1987 | (EP) . |
| 0509671 A1 | 10/1992 | (EP) . |
| 2145657 | 4/1985 | (GB) . |
| 4-243034 | 8/1992 | (JP) . |
| 7-14206 | 1/1995 | (JP) . |

* cited by examiner

Primary Examiner—Tan Dinh
(74) Attorney, Agent, or Firm—Andrew V. Smith

(57) ABSTRACT

Disclosed is an information recording medium capable of, in the case of recording information signals such as high density information, sufficiently transferring the information signals, and suppressing resonance upon high speed rotation and enhancing the durability of the medium. The medium includes a substrate, a recording layer provided on the substrate for recording an information signal, and a light transmission layer laminated on the recording layer, wherein an information signal is recorded or reproduced on or from the medium by making light incident on the medium from the light transmission layer side. The substrate includes a core layer made from a resin, and a surface layer made from a resin and integrated with the core layer. The surface layer has on its one side plane information signals in the form of irregularities on the recording layer side and has a fluidity which is larger than that of the core layer in the case where both the surface layer and the core layer are in a molten state at the same temperature.

10 Claims, 12 Drawing Sheets

TWO-LAYER STRUCTURE

SANDWICH STRUCTURE

TWO-LAYER STRUCTURE

SANDWICH STRUCTURE

SKIN LAYER | CORE LAYER | SKIN LAYER

SKIN LAYER | CORE LAYER | SKIN LAYER

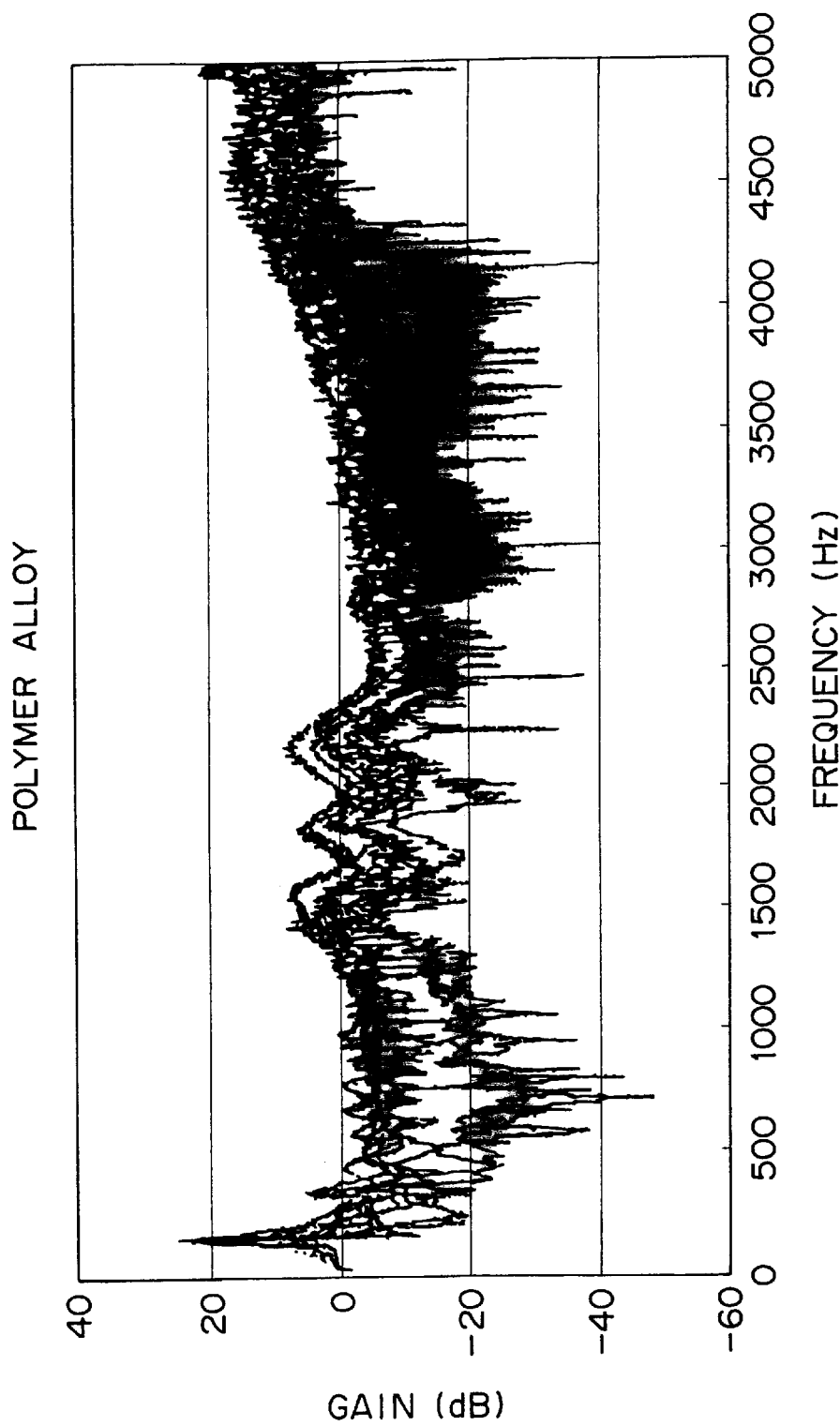

OPTICAL RECORDING MEDIUM HAVING SUBSTRATE OF DUAL TRANSPARENT LAYERS

BACKGROUND OF THE INVENTION

The present invention relates to a disk-like information recording medium for recording various information signals such as an audio signal and a video signal.

As media for recording various kinds of information such as audio information and video information, there are known disk-like optical recording media or magnetic recording media, examples of which include a phase change type optical disk in which information signals are written in the form of irregularities, typically embossed pits or grooves, a magneto-optical disk making use of a magneto-optical effect of a recording film, and a magnetic disk.

A disk substrate having fine irregularities, typically prepits or grooves, is obtained by injection molding a plastic material.

The major drawback of a plastic substrate molded by injection molding lies in that stress is induced by an effect of friction of molten resin against a mold when the molten resin is injected and charged in a cavity of the mold and by effects of pressure and temperature applied to the molten resin upon injection of the molten resin, and the stress remains in the finished substrate. The inner stress of the substrate becomes somewhat small by stress relief taking place during a period of time from cooling to solidification; however, most of the inner stress is not relieved until solidification and remains as a residual stress in the substrate. Such a residual stress may cause birefringence of light and/or warping or waviness of the substrate.

The occurrence stages of the inner stress of a substrate is as follows:

(1) upon injection of resin; shear stress or strain due to molecular orientation occurs in the resin when the resin is fluidized in a cavity;

(2) upon completion of filling; the motion of a screw is rapidly stopped and also the fluidization of the resin is rapidly stopped when the cavity is filled with the resin, so that inertia, forces of the resin and the screw are all applied to the substrate;

(3) at a pressure retention stage; since a pressure is applied to the resin for preventing counter-flow of the resin and preventing shrinkage due to contraction of volume until the resin having been injected is sealed with a gate, a pressure distribution occurs over the entire substrate; and (4) upon cooling the substrate; stress depending on a temperature distribution occurs in the substrate by thermal contraction.

A plastic substrate for an optical information medium or a magnetic recording medium is necessarily contracted by molding. In many cases, the molding contraction of an outer peripheral portion of the plastic substrate is different from that of an inner peripheral portion of the plastic substrate. That is to say, the molding contraction of the outer and inner peripheral portions occurs as follows:

(1) contraction of outer peripheral portion<contraction of inner peripheral portion=deformation in the form of a propeller; and (2) contraction of outer peripheral portion>contraction of inner peripheral portion=deformation in the form of a bowl.

In order to reduce both the deformation due to molding contraction and the deformation due to residual stress induced upon injection of the resin, according to a related art molding method, an attempt has been generally made to reduce the inner pressure applied to the resin by weakening a clamping pressure, retarding the injection speed, and reducing the amount of the resin to fill the cavity. Such an attempt, however, presents another problem that shrinkage or depression and/or swelling occur at an outer peripheral portion of a disk, tending to cause a failure in transfer of information signals and to degrade signal characteristics.

In addition, since the strength of a disk is proportional to the cube of the thickness of the disk, mechanical characteristics such as a flexural strength of the disk become poor as the thickness of the disk becomes thinner with an increase in recording density, and bimetal deformation may significantly occur by heat and film stress caused upon film formation and by moisture absorption in a temperature/moisture environment, particularly, for an optical recording medium of a one-sided recording type.

To solve the above problem, it is desirable to adopt a material having high stiffness, that is, a high flexural or tensile Young's modulus; however, a single plastic material other than glass or metal cannot satisfy such a high stiffness, and a composite material of a plastic material to which fibers or fillers are added can satisfy the above high stiffness but presents problems that surface portions of the fillers or fibers are exposed from the surface of the substrate, to cause surface roughness of the substrate, failing to ensure microflatness of the surface of the substrate excluding transferred fine irregularities, and accordingly, such a composite material cannot be applied to a substrate, for example, used for a disk, which requires a fine structure in the order of nm and that deformation of signals may occur due to protrusion of the fillers from the surface of the substrate or expansion of the fillers.

A plastic substrate is liable to be deformed by heat and moisture caused during the manufacturing process, a user's service environment, and a retention environment on the basis of the above-described various factors, and in the present circumstances, there is no single molding material for a disk, which is optically transparent and withstands moisture absorption, and deformation due to residual stress and contraction deformation of a protective film caused upon film formation.

Along with a tendency toward high density recording, particularly, toward high numerical aperture (NA), there arises a problem in reducing allowable values of warping and waviness, failing to readout recorded signals from a disk or to record signals on the disk, and to solve such a problem, it is expected to develop a disk with less deformation and waviness irrespective of changes in manufacturing process and service environment.

SUMMARY OF THE INVENTION

An object of the present invention is to provide an information recording medium capable of sufficiently transferring information signals, suppressing resonance upon high speed rotation, and enhancing the durability.

According to the present invention, there is provided a disk-like information recording medium, which basically includes: a substrate; a recording layer, provided on the substrate, for recording an information signal; and a light transmission layer laminated on the recording layer; wherein an information signal is recorded or reproduced on or from the medium by making light incident on the medium from the light transmission layer side. The above information recording medium is characterized in that the substrate includes a core layer made from a resin; and a surface layer made from a resin and integrated with the core layer, the surface layer having on its one side plane information signals in the form of irregularities on the recording layer side and having a fluidity which is larger than that of the core layer in the case where both the surface layer and the core layer are in a molten state at the same temperature.

With this configuration, since the resin forming the surface layer has a fluidity larger than that of the resin forming the core layer, irregularities on the recording layer side can be certainly transferred on the surface layer when the recording layer and the light transmission layer are disposed on the resin made surface layer. Accordingly, for a high density information recording medium, it is possible to sufficiently, certainly perform transfer of narrow tracks, deep grooves or pits.

According to the present invention, the resin forming the surface layer of the substrate may be preferably a resin having a water absorption ratio of 0.3% or less.

With this configuration, since the water absorption ratio is 0.3% or less, the above-described deformation due to water absorption becomes small, and for example, in the case of a digital versatile disk (DVD: high density information recording medium), the warping deformation becomes 0.4° or less in accordance with the standard. The DVD generally uses a substrate made from polycarbonate having a water absorption ratio of 0.3% or more however, since the DVD is configured such that two disks each having a thickness of 0.6 mm are stuck to each other with the signal side directed inwardly, it takes a good balance of water absorption even if having a larger water absorption ratio, to be thus less deformed. On the contrary, a high density disk having a high numerical aperture (NA) exhibits a balance of water absorption which is different from that of the DVD because it includes information signals on one side of a surface layer.

Accordingly, for the high density disk having a high numerical aperture (NA), to keep a warping deformation angle or radial skew angle due to water absorption within 0.4° or less, the substrate of the disk is required to have a water absorption ratio of 0.3% or less.

However, if the surface layer has a water absorption ratio of 0.3% or more, there occurs an inconvenience that water absorption and dewatering are performed from the surface side or recording side, on which the recording film and protective film are formed, of the disk in a temperature/moisture environment other than upon film formation which applies stress to the substrate, and such water absorption and dewatering are balanced in the retention and service environments.

Under the above different environments, since the recording film and protective film on the surface side are different (generally smaller) in water absorption ratio from (than) the substrate material on the opposed side, the signal side is inwardly warped in the water absorption state, and is outwardly deformed in the drying state. In particular, during drive of the disk, since the inner temperature of the disk is high and the moisture is low, there may easily occur a rapid deformation, leading to a focus error which for example, makes impossible to readout signals.

The resin forming the surface layer of the substrate may be most preferably a resin having a water absorption ratio of 0.1% or less.

Even in the case where the above water absorption ratio is in a range of 0.3% or less, if the warping angle of the disk upon balance of water absorption is zero, water absorption deformation can be kept at an angle within 0.4° or less. However, in consideration of a variation in dimension of the disk during manufacture and of a retention environment, the disk in which the surface layer has a water absorption ratio being as small as 0.1% or less, that is, substantially does not absorb water, is advantageous in increasing the system margin because it is not required to take into account the water absorption deformation of the disk in retention and service environments but required to suppress only deformation of the disk during manufacture.

According to the present invention, the resin forming the core layer of the substrate may be preferably a vibration damping resin for suppressing a resonance phenomenon caused upon rotation of the information recording medium.

With this configuration, since the core layer of the substrate is made from a vibration damping resin, it is possible to certainly suppress a resonance phenomenon caused upon high speed rotation of the information recording medium.

According to the present invention, the vibration damping resin may be preferably a composite material containing a polymer and a filler.

With this configuration, since the signal transfer layer and the high stiffness or vibrational characteristic layer in the disk are made from different materials, the characteristics of both the layers, which have been not compatible with each other by use of a single common material, can be compatible with each other. For example, it is possible to obtain a disk in which signals in the form of irregularities of 0.5 µm in pitch and 150 nm in depth are transferred and a high stiffness is given, which disk has not been obtained by use of a related art high stiffness single material containing an additive such as a filler or the like.

In the above configuration, not only the high stiffness but also the vibrational characteristic can be improved. Also the surface layer or skin layer and the core layer are not necessarily integrally molded by two-layer molding or sandwich molding, but they may be formed by sticking different materials to each other.

According to the present invention, a material having plate-like shape and a high aspect ratio may be preferably added as a filler to the resin forming the core layer of the substrate.

With this configuration, since a material having plate-like shape and a high aspect ratio is added to the resin forming the core layer, the stiffness of the core layer can be enhanced. The aspect ratio is a ratio of the length to the diameter of a filler, and the stiffness of a resin is determined on the basis of the aspect ratio of a filler added to the resin. A resin to which a filler having a small aspect ratio, for example, a filler having spherical shape is added in a specific amount is lower in stiffness than the same resin to which a filler having a high aspect ratio, for example, a filler having plate-like shape is added in the same amount.

As a filler having a high aspect ratio, there is known a filler having plate-like shape and a filler in the form of fibers. The filler in the form of fibers, however, is undesirable because it has a high anisotropy. To be more specific, in the case of molding a disk substrate using a resin to which such a filler is added, the contraction ratio in the peripheral direction is made extremely different from that in the radial direction, to inevitably cause propeller-shaped deformation of the substrate. As a result, it is desirable to add a filler of plate-like shape having a high aspect ratio and having a small anisotropy to the resin forming the core layer.

According to the present invention, a filler in the form of hollow or foam bodies may be preferably added to the resin forming the core layer of the substrate.

With this configuration, it is possible to reduce the weight of the core layer, and hence to reduce a load upon high speed rotation of the information recording medium.

According to the present invention, the light transmission layer may be preferably a sheet made from a photo-curing resin or an optical transparent resin.

According to the present invention, the resin forming the core layer may be preferably a mixture obtained by adding a filler imparting both a stiffness characteristic and a vibration damping characteristic to a resin identical to or different from the resin forming the surface layer.

With this configuration, since the stiffness and damping characteristic are given to the core layer, it is possible to keep a high stiffness of the information recording medium and dampen the vibration thereof upon high speed rotation of the information recording medium.

According to the present invention, the surface layer and the core layer may be preferably laminated to each other by simultaneously injection molding the surface layer and the core layer in such a manner that information signals in the form of irregularities are transferred on one side plane of the surface layer.

With this configuration, it is possible to obtain a substrate with a two-layer structure by simultaneously laminating the surface layer and the core layer to each other by injection molding, and also to transfer information signals in the form of irregularities on the surface layer.

According to the present invention, the surface layer may preferably include a first surface layer formed on one side plane of the core layer and having information signals in the form of irregularities on the recording layer side; and a second surface layer formed on the other side plane of the core layer. With this configuration, it is possible to obtain a substrate with a three-layer structure.

BRIEF DESCRIPTION OF THE DRAWINGS

FIG. 15 is a diagram showing a vibrational characteristic of an example of the disk-like information recording medium of the present invention.

DETAILED DESCRIPTION OF THE PREFERRED EMBODIMENTS

Hereinafter, preferred embodiments of the present invention will be described with reference to the accompanying drawings.

Figure 1:
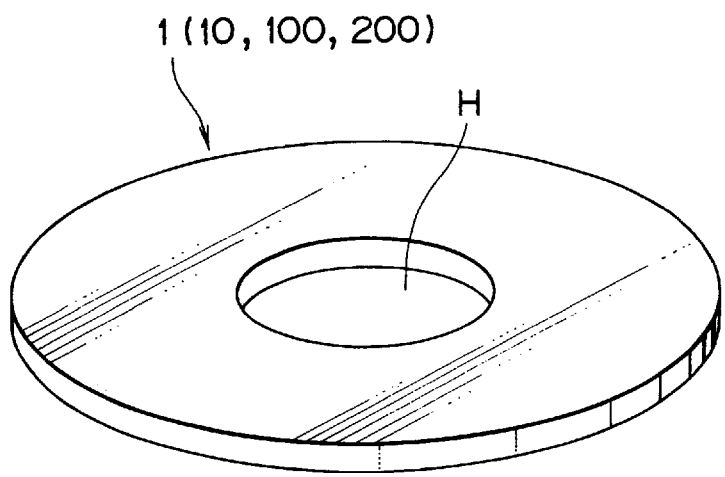
FIG. 1 is a perspective view showing a preferred embodiment of a disk-like information recording medium of the present invention.

FIG. 1 shows a preferred embodiment of a disk-like information recording medium of the present invention. A disk-like information recording medium 1 has a center hole H.

Figure 2:
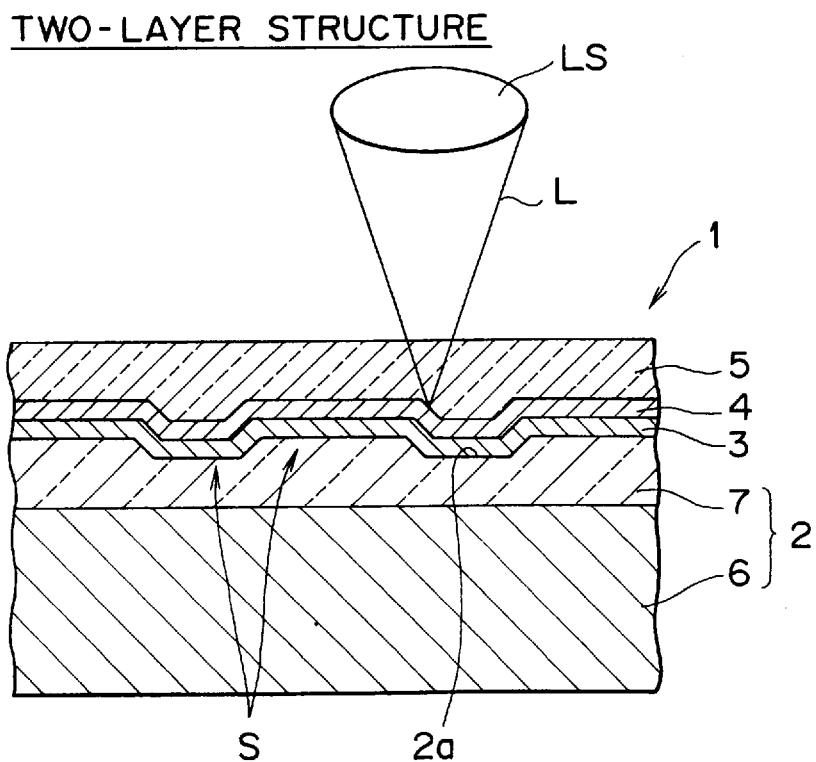
FIG. 2 is a view showing a sectional example of a two-layer structure of the disk-like information recording medium shown in FIG. 1.
Figure 3:
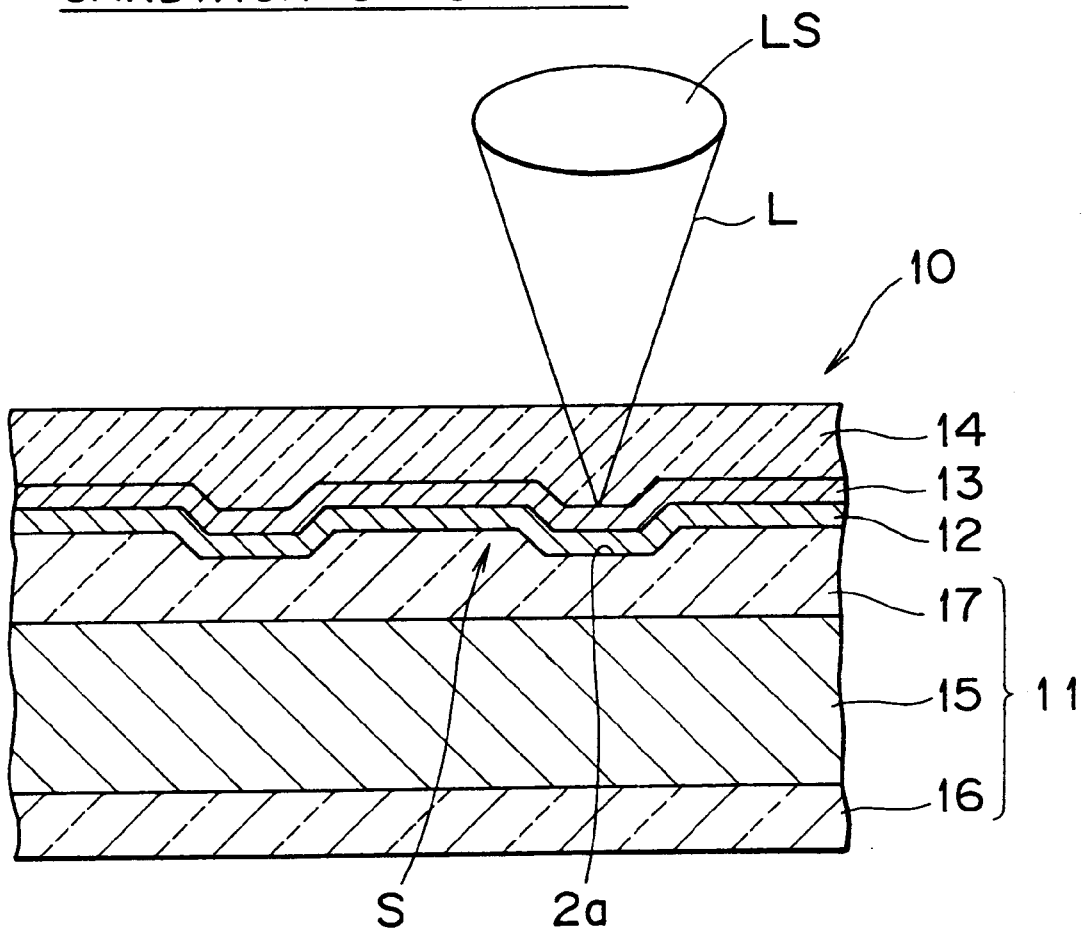
FIG. 3 is a view showing a sectional example of a sandwich structure of the disk-like information recording medium shown in FIG. 1.

FIGS. 2 and 3 show sectional structure examples of the disk-like information recording medium 1 shown in FIG. 1.

The disk-like information recording medium shown in FIG. 2 has a two-layer structure, and the disk-like information recording medium shown in FIG. 3 has a sandwich structure of three layers.

As disk-like information recording media, optical information recording media for recording various kinds of information such as audio information or video information, various optical information recording media for performing recording or reproducing by light irradiation are examples. For example, as disk-like information recording media, there are known a compact disk (CD: trade name), a rewritable magneto-optical disk, a phase change disk, and the like. In an information recording layer of the disk-like information recording medium of these types, it is required to form rows of patterns of fine irregularities such as prepits or grooves for recording data information, tracking servo signals, and the like.

The disk-like information recording medium 1 of a type including a substrate of the two-layer structure shown in FIG. 2 is manufactured by laminating a light transmission layer 5, a recording layer 4, and a light reflection layer 3 on a substrate 2 of the two-layer structure.

The substrate 2 is formed by laminating a surface layer (also called a skin layer) 7 to a core layer 6. The thickness of the core layer 6 is larger than that of the surface layer 7. Prepits or grooves are formed in one side plane of the surface layer 7. The light reflection layer 3, recording layer 4 and light transmission layer 5 are laminated on the surface layer 7.

Referring to FIG. 2, a laser beam L is made incident on the information recording medium 1 from the light transmission layer 5 side, to read an information signal or record an information signal from or on the information recording medium 1. The laser beam L introduced from a lens LS passes through the light transmission layer 5 and the recording layer 4, being reflected from the light reflection layer 5, and is returned to the lens LS side.

The disk-like information recording medium 10 having the sandwich structure shown in FIG. 3 is formed by laminating a light transmission layer 14, a recording layer 13, and a light reflection layer 12 on a substrate 11 of the sandwich structure having three layers.

Surface layers (skin layers) 16 and 17 are laminated on both surfaces of a core layer 15 of the substrate 11. The thickness of the core layer 15 is larger than that of each of the surface layers 16 and 17.

Irregularities such as prepits or grooves are formed in one side plane of the surface layer 17. The light reflection layer 12, recording layer 13, and light transmission layer 14 are laminated on the surface layer 17. A laser beam L introduced from a lens LS passes through the light transmission layer 14 and the recording layer 13 is made incident on the light reflection layer 12, and the laser L reflected from the light reflection layer 12 is returned to the lens LS side.

In the structural example of the disk-like information recording medium shown in FIG. 2, the core layer 6 of the substrate 2 integrally holds the surface layer 7, and in the structural example of the disk-like information recording medium shown in FIG. 3, the core layer 15 of the substrate 11 integrally holds the surface layers 16 and 17. Each of the core layers 6 and 15 is made from a resin; while each of the surface layers 7, 16 and 17 is made from a resin having a fluidity larger than that of the core layer at the same temperature environment. The light transmission layer is made from, for example a photo-curing resin, preferably, an ultraviolet-curing resin or optically transparent resin sheet.

A molding machine for molding the substrate 2 shown in FIG. 2 or the substrate 11 shown in FIG. 3 will be described with reference to FIGS. 4 and 5.

Figure 4:
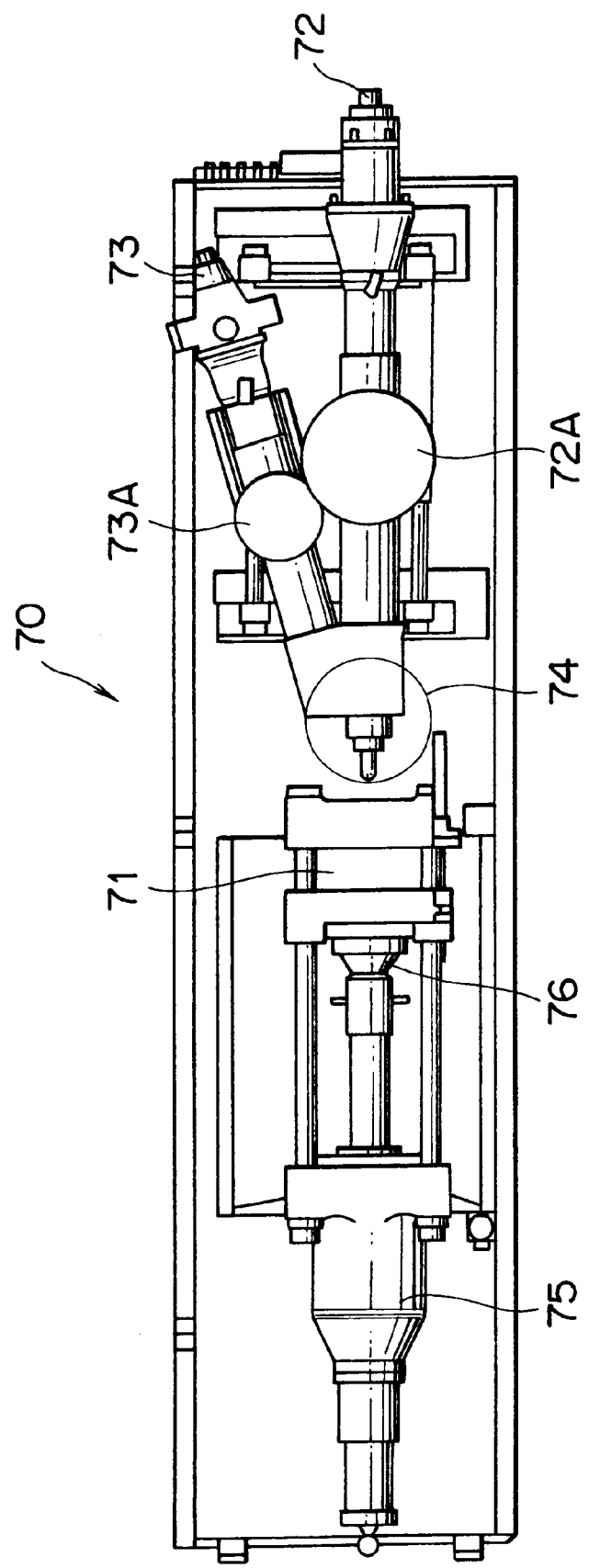
FIG. 4 is a view showing a molding machine for molding a disk-like information recording medium.
Figure 5:
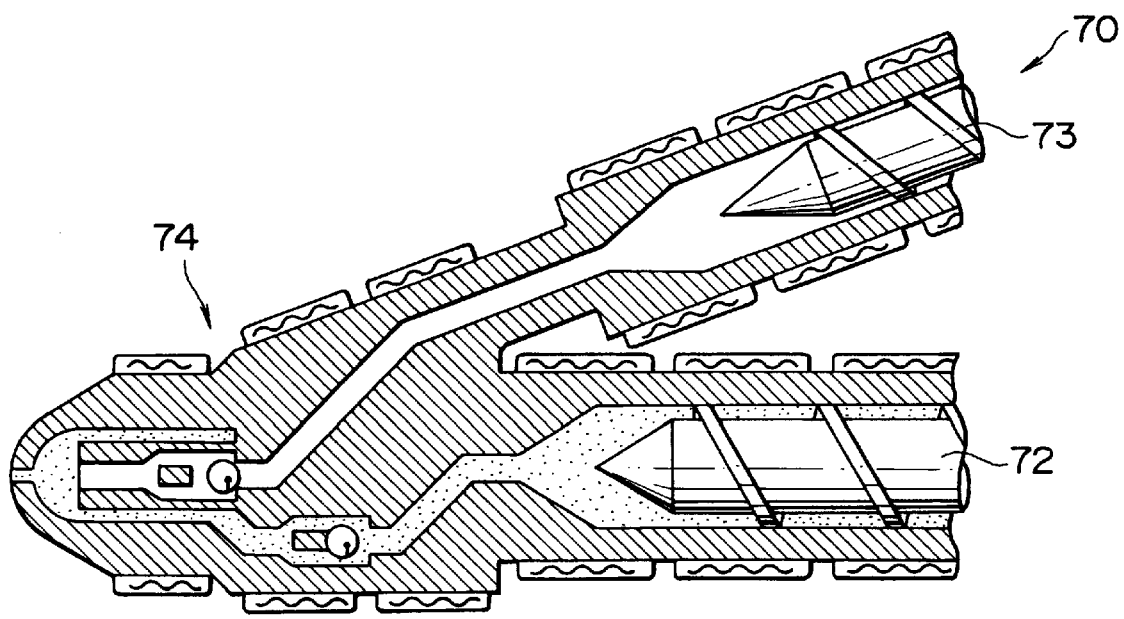
FIG. 5 is a sectional view showing a nozzle and its neighborhood of the molding machine shown in FIG. 4.

FIGS. 4 and 5 show a molding machine 70.

Referring to FIG. 4, the molding machine 70 has a mold unit 71, an injection unit 72, and another injection unit 73. The injection path of the injection unit 72 is joined to that of the injection unit 73 at a nozzle 74. A hopper 72A is disposed on the midway of the injection unit 72, and a hopper 73A is disposed on the midway of the injection unit 73.

Figure 6:
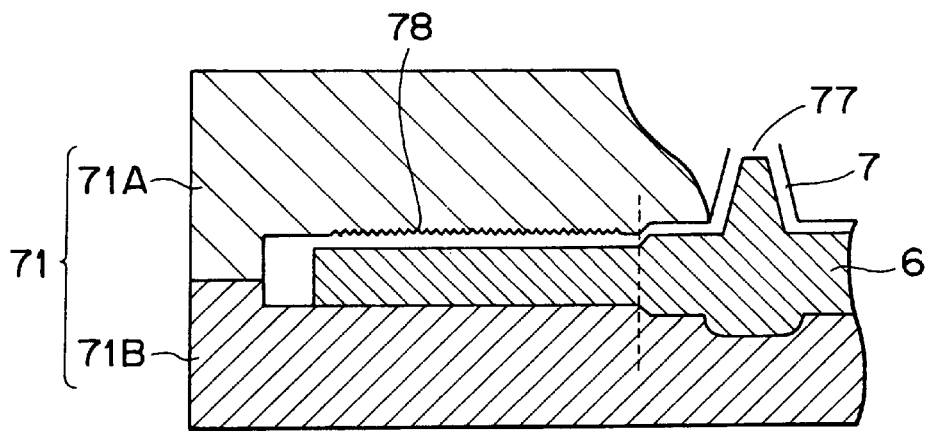
FIG. 6 is a view showing the disk-like information recording medium with the two-layer structure molded by the molding machine.

The mold unit 71 faces to a nozzle 74 and has a fixed mold 71A and a movable mold 71B shown in FIG. 6. The movable mold 71B can be held at a specific position with respect to the fixed mold 71A by operating a piston 76 through a clamping cylinder 75.

FIG. 5 shows the nozzle 74 shown in FIG. 4 and its neighborhood. As shown in FIG. 5, the injection paths of the injection units 72 and 73 are joined to each other at the nozzle 74. For example, a resin for forming the surface layer (skin layer) 7 shown in FIG. 2 is fed into the hopper 72A shown in FIG. 4, and a resin for forming the core layer 6 shown in FIG. 2 is fed into the hopper 73A shown in FIG. 4.

FIG. 6 shows the fixed mold 71A and the movable mold 71B of the mold unit 71 shown in FIG. 4. The resins are injected from the injection units 72 and 73 into a cavity between the fixed mold 71A and the movable mold 71B through a spool 77, to almost simultaneously mold the core layer 6 and the surface layer 7. In this case, a portion for forming prepits or grooves 78 is disposed on the mold 71A to form the pits or grooves 78 on the surface layer 7 simultaneously with molding of the core layer 6 and the surface layer 7.

Figure 7:
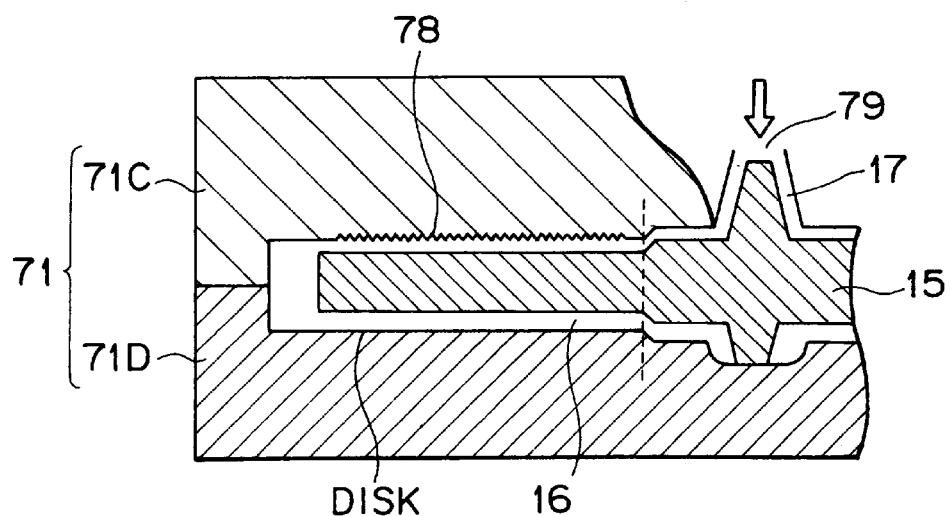
FIG. 7 is a view showing the disk-like information recording medium with the sandwich structure molded by the molding machine.

The mold 71 shown in FIG. 7 includes a fixed mold 71C and a movable mold 71D. The core layer 15 and the surface layers 16 and 17 shown in FIG. 3, which constitute the substrate with the sandwich structure, using the fixed mold 71C and the movable mold 71D.

Even in this case, resins are injected from the injection units 72 and 73 into a cavity between the fixed mold 71C and the movable mold 71D through a spool 79. At this time, prepits or grooves 78 are formed on the surface layer 17 side. The prepits or grooves 78 correspond to irregularities shown in FIG. 3.

The irregularities such as the prepits or grooves 78 are already formed on the substrate composed of the core layer and surface layer laminated to each other shown in FIG. 6 or 7. The light transmission layer, recording layer, and light reflection layer shown in FIG. 2 or 3 are sequentially formed on the substrate.

The disk-like information recording medium of the present invention will be more fully described with reference to the following examples:

1 Example of Disk-like Information Recording Medium with Improved Stiffness by Sandwich Molding

[material for skin layer A]:

A-1) polycarbonate (produced by Teijin Limited)
grade: AD-9000TG
glass transition point=145° C.
flexural modulus=2,200 MPa
water absorption rate=0.3%

A-2) Zeonex (Nippon Zeon Co., Ltd.)
grade: E48R
glass transition point=140° C.
flexural modulus=25,000 kgf/cm$^2$
water absorption rate<0.01%

[material for core layer B]:

polycarbonate (grade: AD-5503, produced by Teijin Limited) to which each of talc, mica and flaky glass is added for improving the flexural modulus B-1: polycarbonate+powder of talc
added amount: 20%
flexural modulus for single body=3,900 MPa (=3,900 MPa)

B-2: polycarbonate+powder of mica
added amount: 20%
flexural modulus for single body=5,900 MPa (=5,400 MPa)

B-3: polycarbonate+powder of flaky glass
added amount: 20%
flexural modulus for single body=3,600 MPa (=3,700 MPa)

The above flexural modulus for single body is obtained by a measurement method specified under the standard of ASTM D790, and the value in the parenthesis is the result of measuring a sample cut off from an actual molded disk by a laboratory vibration lead method, and since there is no significant difference therebetween, the following data are expressed in results obtained by the vibration lead method.

The substrate 11 with the sandwich structure shown in FIG. 3 was molded by using each of the above materials A-1 and A-2 for the skin layer A and each of the above materials B-1, B-2 and B-3 for the core layer B. To be more specific, as shown in FIG. 7, the substrate 11 was molded by two different material simultaneously molding method using the molding machine 70 shown in FIGS. 4 and 5, wherein the material for the skin layer was fed into the injection unit 72 and the material for the core layer was fed into the injection unit 73.

Figure 8:
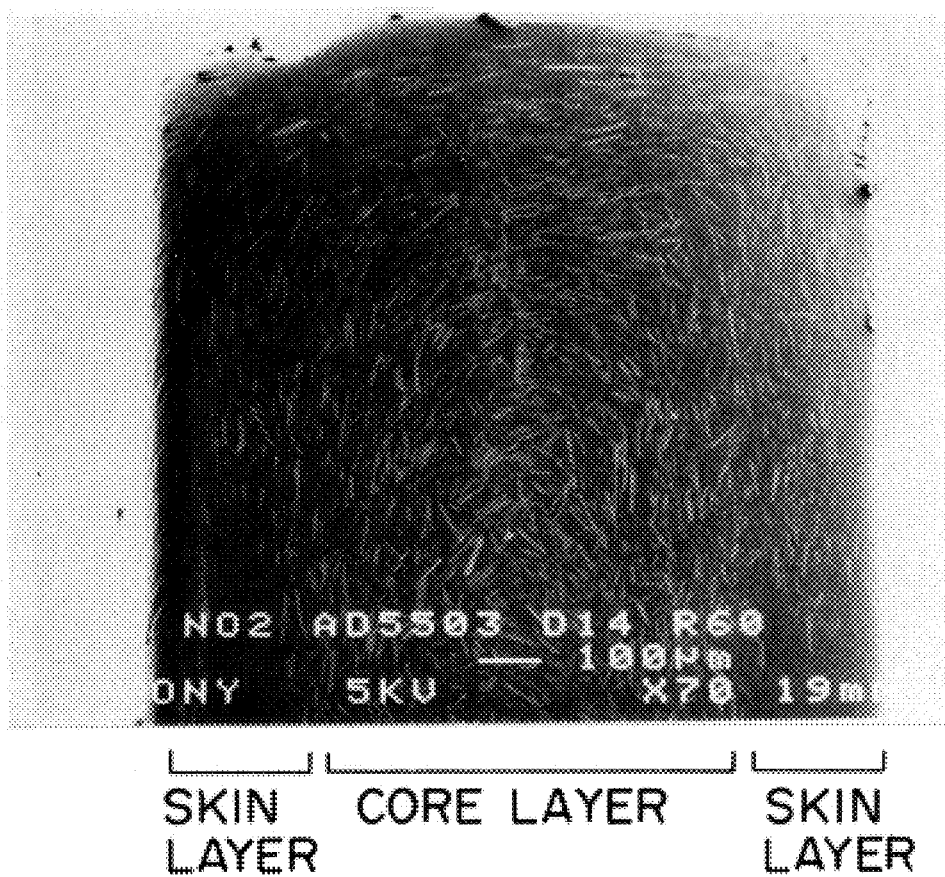
FIG. 8 is a microphotograph showing a sectional state of an outermost peripheral portion and its neighborhood of the disk-like information recording medium with the sandwich structure obtained in accordance with the present invention.
Figure 9:
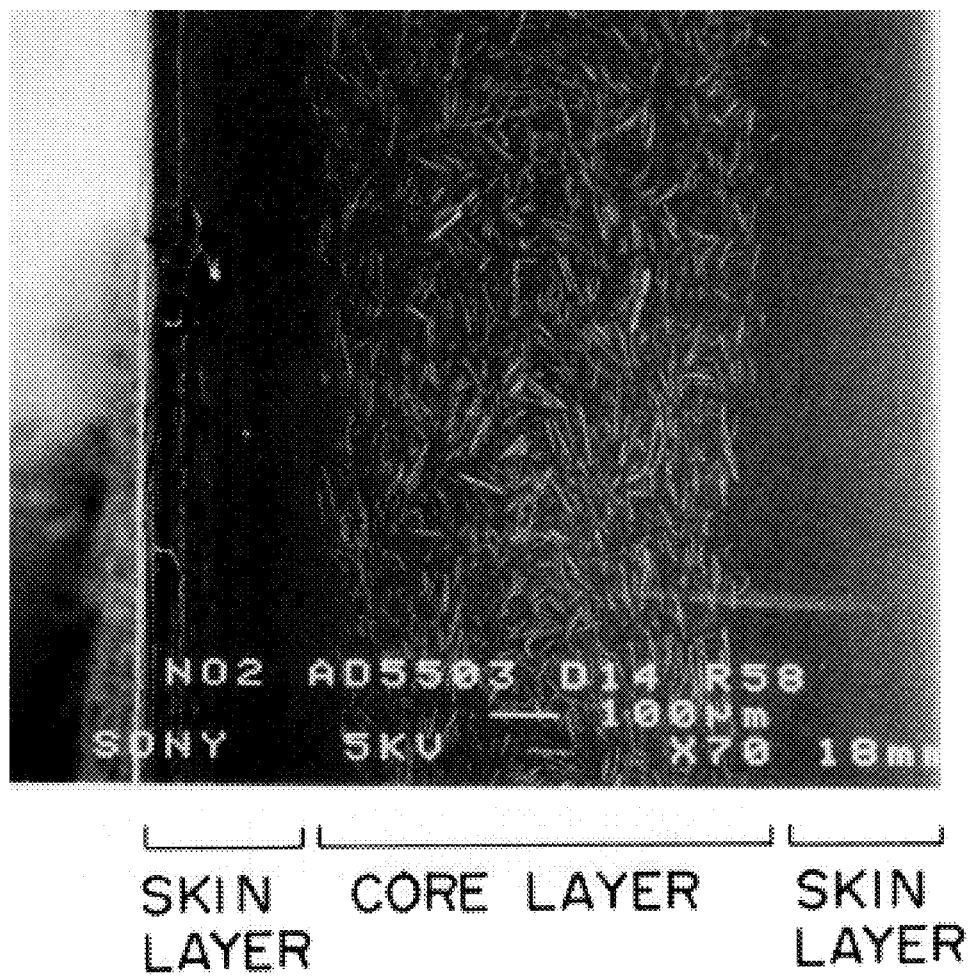
FIG. 9 is a microphotograph showing a sectional state of a central portion and its neighborhood of the disk-like information recording medium with the sandwich structure obtained in accordance with the present invention.
Figure 10:
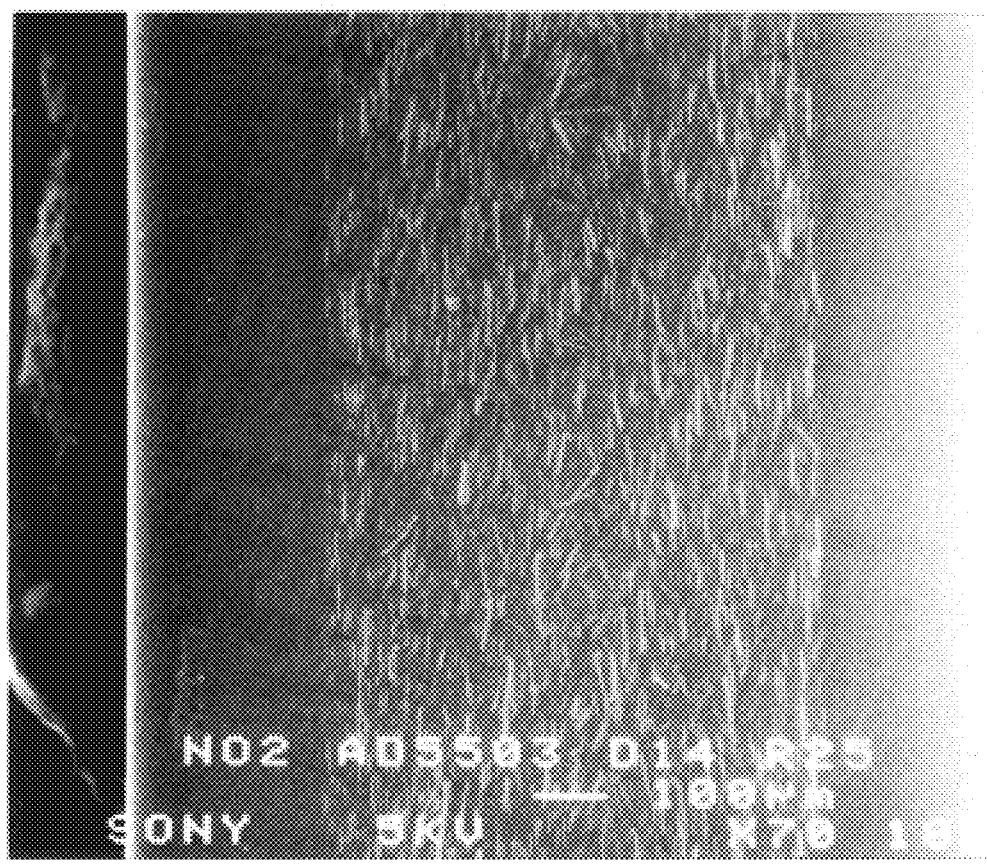
FIG. 10 is a microphotograph showing a sectional state of an innermost peripheral portion and its neighborhood of the disk-like information recording medium with the sandwich structure obtained in accordance with the present invention.

FIGS. 8 to 10 show sectional structure examples of the disk-like information recording medium of the sandwich structure thus obtained, wherein FIG. 8 shows the sectional state of an outermost peripheral portion of the disk-like information recording medium. FIG. 9 shows the sectional state of a central portion of the disk-like information recording medium. FIG. 10 shows the sectional state of an innermost peripheral portion of the disk-like information recording medium.

In the disk-like information recording medium shown in FIGS. 8 to 10, the material B-2 (polycarbonate+powder of mica) was used as the material for forming the core layer.

The configuration of the disk shown in FIGS. 8 to 10 is as follows:
1.2 mm in thickness, DC grooves
signal depth=80–150 nm
track pitch=0.7–0.85 μm (variable)
[Procedure of Molding]:
1) The resin for the skin layer was injected in short-shot. The injected amount of the resin for the skin layer was in a range of about 40–50% of the total weight of the disk.
2) The resin for the core layer was injected within a period of 0.02–0.5 sec in which the resin for the skin layer was in a molten state so as to advance in the radial direction along a central portion (to be formed into the core layer) in the thickness direction of the skin layer, to prepare the sandwich structure.

The injected resin for the core layer advances in the central molten portion of the resin for the skin layer having been injected, to thereby obtain the sandwich structure.

When the short-shot amount of the first resin for the skin layer was set at 7 g, the thickness of each skin layer of the sandwich structure was 0.3 mm.
[Molding Condition]:
mold temperature: 130° C.
resin temperature: 320° C. on mold 71A side, 290° C. on mold 71B side
injection speed:
mold 71 A side=140 mm/sec in average
mold 71 B side=160 mm/sec in average
cooling time: 9 sec A strip-shaped sample having a width of 5 mm, a thickness of 1.2 mm and a length of 80 mm cut from each disk-like substrate thus obtained was measured in terms of flexural modulus by the vibration lead method. The results are as follows:
(1) The flexural modulus of the substrate using the resin B-1 for forming the core layer was 2,500 MPa which was equivalent to 1.2 times the conventional flexural modulus of 2,100 MPa.
(2) The flexural modulus of the substrate using the resin B-2 for forming the core layer was 2,650 MPa which was equivalent to 1.26 times the conventional flexural modulus of 2,100 MPa.
(3) The flexural modulus of the substrate using the resin B-3 for forming the core layer was 2,800 MPa which was equivalent to 1.34 times the conventional flexural modulus of 2,100 MPa.

Figure 11:
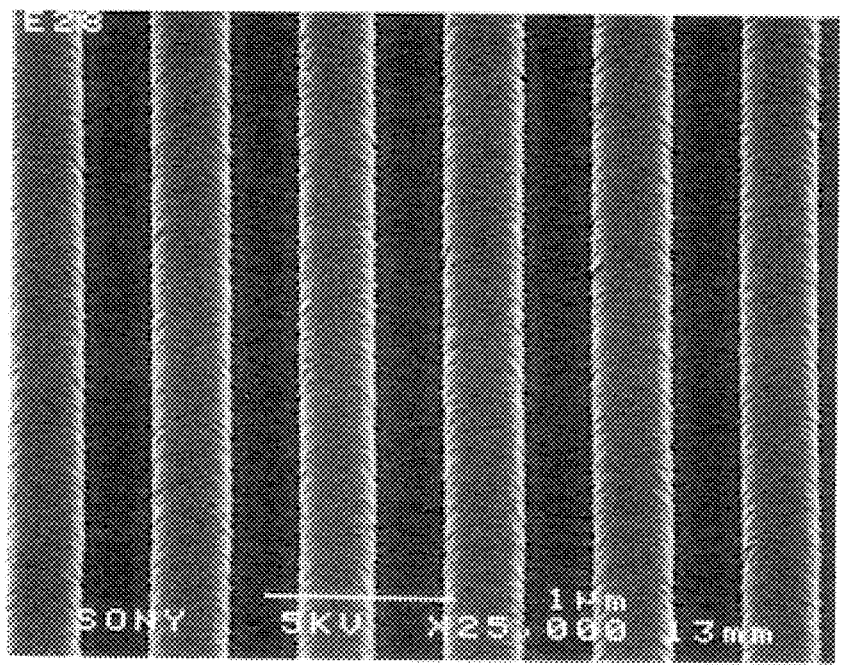
FIG. 11 is a microphotograph showing a transfer state of grooves of the disk-like information recording medium obtained by sandwich molding.
Figure 12:
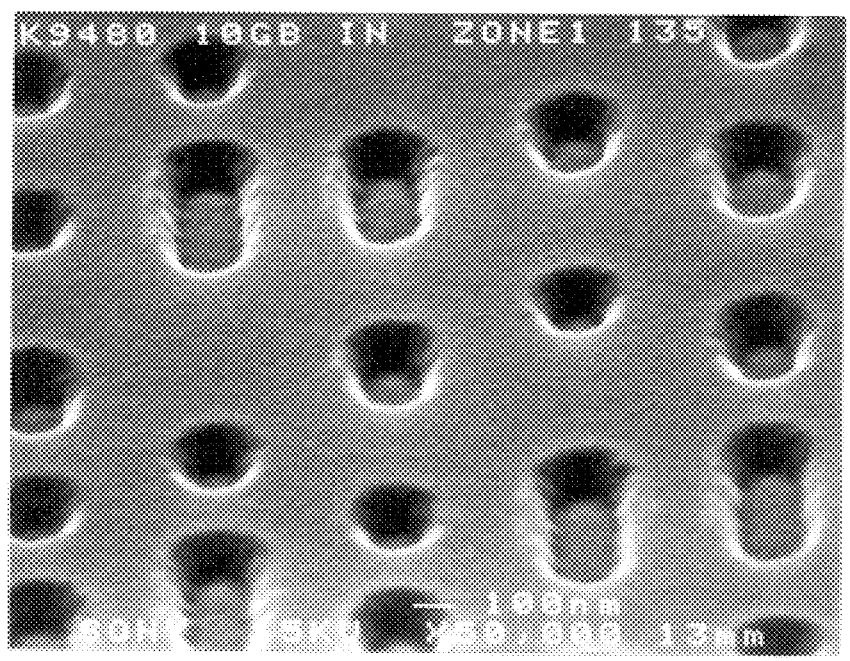
FIG. 12 is a microphotograph showing a transfer state of pits of the disk-like information recording medium obtained by sandwich molding.

Examples of the surface characteristic of the surface layer thus obtained are shown in FIGS. 11 and 12. FIG. 11 shows the example of transfer of grooves in the substrate of the disk-like information recording medium molded by sandwich molding. As is apparent from this figure, the influence of the filler does not appear on the surface of the surface layer. FIG. 12 shows the example of transfer of pits in the substrate of the disk-like information recording medium molded by sandwich molding.

2 Example of Disk-like Information Recording Medium with Improved Resonance Characteristic by Sandwich Molding In this example, the vibration characteristic of the medium was improved by increasing an inner loss in a core layer.
[material for skin layer]:
polycarbonate (produced by Teijin Chemicals Ltd.)
optical disk grade: AD-9000TG
glass transition point=145° C.
flexural modulus=2,200 MPa
[material for core layer]:
A) polycarbonate (CD grade: AD-5503, produced by Teijin Chemicals Ltd.) to which a mixture of the following fillers is added;
(1) conductive carbon black: 16 wt %
(2) whisker: 10% (whisker of calcium silicate)
(3) graphite 10% (particle size of 300 to 400 μm)
The above fillers are mixed at a mixing ratio of (1):(2):(3)=4: 2: 1.
[Molding Condition]:
resin molding temperature:
skin side: 320° C.
core side: 320° C.
nozzle tip temperature: 290° C.
mold temperature: 125° C.
cooling time: 16 sec
average injection speed: 140 mm/sec A sample having a width of 5 mm, a thickness of 1.5 mm and a length of 80 mm cut from a disk with the sandwich structure was measured in terms of inner loss and stiffness (Young's modulus) by the vibration lead method.
[material for core layer]:
B) polymer alloy
(1) resin prepared by mixing 50 wt % of polycarbonate with 50 wt % of acrylic resin incompatible with polycarbonate
(2) the above resin A) composed of polycarbonate to which mixture of fillers is added The resin (1) was mixed with the resin (2) at a mixing ratio of (1):(2)=5:1, to prepare the polymer alloy B).

A sample having a width of 5 mm, a thickness of 1.5 mm and a length of 80 mm cut from a disk with the sandwich structure molded under the same condition as that described above in the previous example was measured in terms of inner loss and stiffness (Young's modulus) by the vibration lead method.

Figure 13:
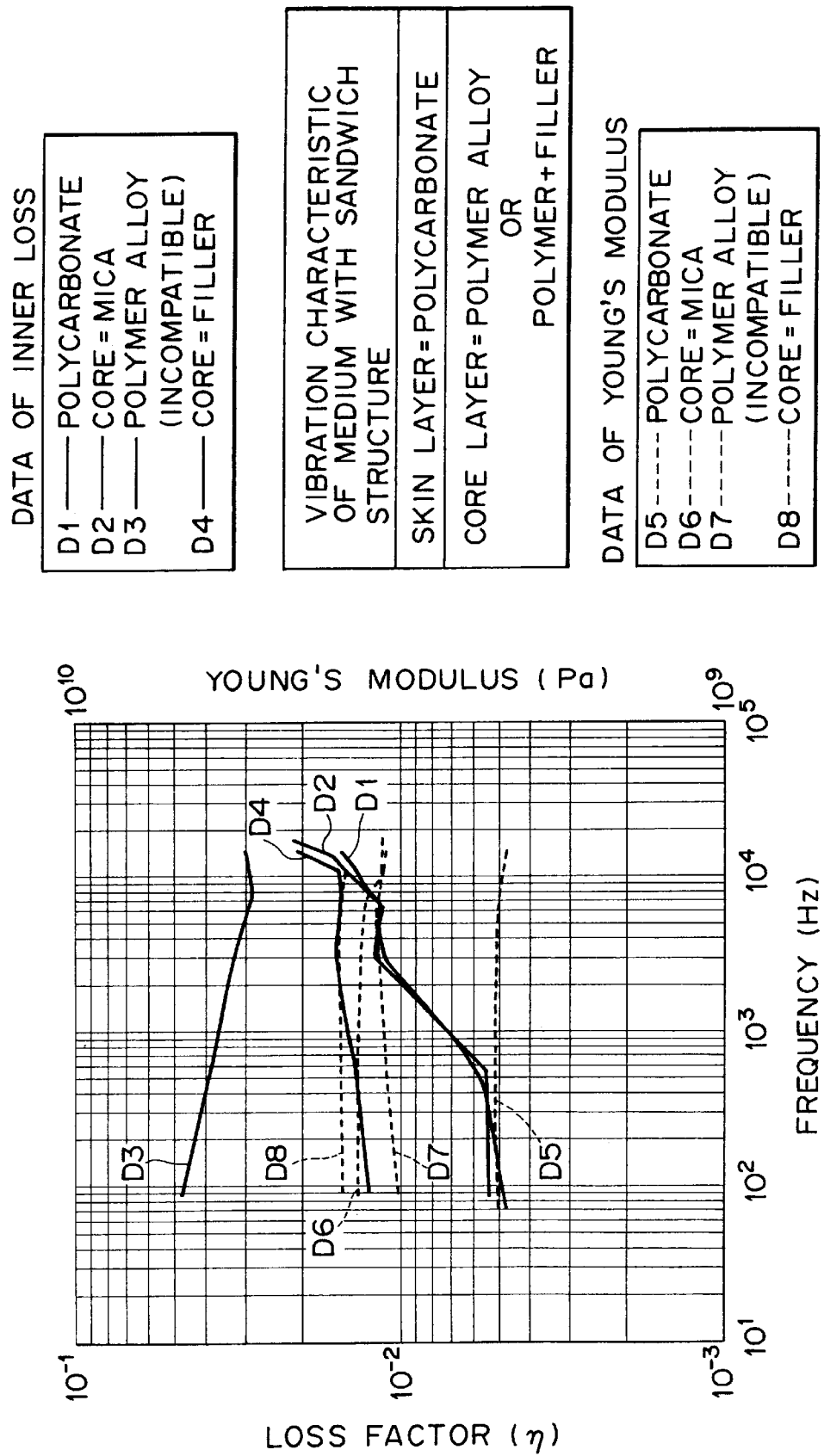
FIG. 13 is a diagram showing a relationship between a frequency and each of an inner loss and a Young's modulus for each example of the disk-like information recording medium.

FIG. 13 shows results of measuring a loss factor η indicating the inner loss of vibration and a Young's modulus (Pa) indicating the stiffness for the substrate 11 with the sandwich structure in which polycarbonate is used for the surface layer (skin layer) and each of the polymer alloy B) and the filler mixed polycarbonate A) is used for the core layer.

In FIG. 13, a solid line D3 shows the inner loss of the substrate 11 in which the incompatible polymer alloy B) is used for the core layer, and a solid line D4 shows the inner loss of the substrate 11 in which the filler mixed polycarbonate A) is used for the core layer. For comparison, a solid line D2 shows the inner loss of the substrate 11 in which polycarbonate added with 20% of mica for improving only the stiffness is used for the core layer, and a solid line D1 shows the inner loss of the substrate 11 in which polycarbonate is used for the core layer.

Further, in FIG. 13, a broken line D7 shows the Young's modulus of the substrate 11 in which the incompatible polymer alloy B) is used for the core layer, and a broken line D8 shows the Young's modulus of the substrate 11 in which the filler mixed polycarbonate A) is used for the core layer. For comparison, a broken line D6 shows the Young's modulus of the substrate 11 in which polycarbonate added with 20% of mica for improving only the stiffness is used for the core layer, and a broken line D5 shows the Young's modulus of the substrate 11 in which polycarbonate is used for the core layer.

From the above results of FIG. 13, it becomes apparent that the substrate in which the incompatible polymer alloy A) is used for the core layer, shown by the solid line D3 and the broken line D7, is most preferable in consideration of both the inner loss of vibration and Young's modulus (stiffness).

Figure 14:
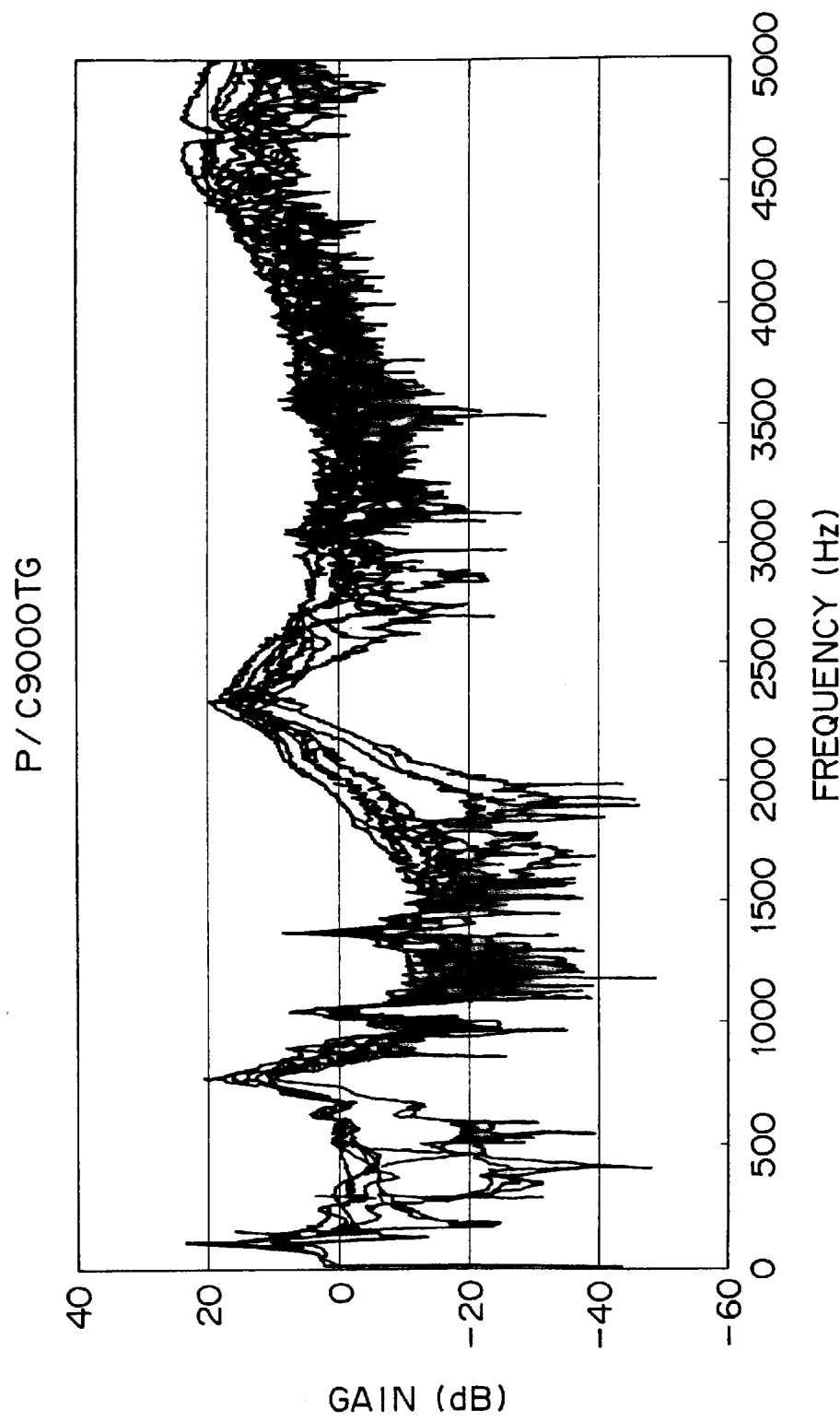
FIG. 14 is a diagram showing, for comparison, a vibrational characteristic of a related art disk-like information recording medium.

The inner loss (dB) of an inventive disk prepared by using the substrate including the core layer made from the polymer alloy is plotted for each frequency as shown in FIG. 15 and is compared with that of a related art polycarbonate disk shown in FIG. 14. The values for the composite disk with the sandwich structure are of course lower than those for the single substrate however, the inner loss of the composite disk is larger than that of the related art disk, and the resonance characteristic, obtained by oscillating the disk, of the inventive disk shown in FIG. 15 is significantly improved as compared with the related art disk shown in FIG. 14. In addition, the three-layer structure of the inventive disk was the perfect sandwich structure in which the thickness of each skin layer was 0.3 mm and the thickness of the core layer was 0.6 mm.

3 Example of Disk-like Information Recording Medium with Reduced Weight by Sandwich Molding

[material of skin layer]:
Zeonex (produced by Nippon Zeon Co., Ltd.)
grade: E280R
specific gravity=1.01
(specific gravity of polycarbonate=1.20)
flexural modulus=21,000 kgf/cm$^2$
water absorption ratio<0.01%

[material of core layer]:
Zeonex, grade E280R to which 30% of the following additive is added;
additive: high density (0.2 g/cm$^3$) perlite based filter aid (trade name: Roka Help, produced by Mitsui Mining & Smelting Co., Ltd.)

[Molding Procedure]:
The resin for the skin layer was injected in short-shot in the same manner as described above.

The injected amount of the resin for the skin layer was about 40% on the basis of the total weight of the disk.

Then, the resin for the core layer was injected within a period of 0.02–0.5 sec while the skin layer was not solidified, to obtain a sandwich structure. The thickness of each skin layer of the sandwich structure was 0.3 mm.

[Molding Condition]:
mold temperature: 130° C.
resin temperature: 320° C. on mold 71A side,
320° C. on mold 71B side
injection speed:
mold 71 A side=140 mm/sec in average
mold 71 B side=160 mm/sec in average
cooling time: 9 sec The weight of a disk with a sandwich structure thus obtained was reduced by 40% or more as compared with the related art polycarbonate disk.

Comparison in Weight of Disk of 12 cm in Size and 1.2 mm in Thickness (1) related art polycarbonate disk 16.1 g/piece in average (2) single disk made from Zeonex: 13.85 g/piece in average (3) disk with sandwich structure: 9.46 g/piece in average In this way, the present invention provides a flat disk (information recording medium) exhibiting a stiffness larger than that of a related art disk, preventing occurrence of resonance, and achieving a high transfer characteristic of irregularities in combination with excellent mechanical properties, which characteristics have been not obtained using only a single resin or single composite material.

While a related art disk is difficult to keep its flatness against heat and film stress, contraction stress of a protective film, and temperature/moisture upon film formation, the inventive disk can significantly keep its flatness against the above factors by interposing a core layer having a high stiffness.

For the information recording medium in which the intermediate layer or core layer is made from a resin having a high damping characteristic capable of suppressing resonance due to plane runout caused upon rotation of the medium, it is possible to suppress occurrence of resonance even if the medium is rotated at a high speed.

For the information recording medium in which the intermediate layer is made from a polymer or a filler mixed composite resin capable of improving the damping characteristic, characteristics having not been compatible with each other by use of a single material can be compatible with each other. For example, it is possible to obtain a disk in which signals in the form of irregularities of 0.5 $\mu$m in pitch and 150 nm in depth are transferred and a high stiffness is given, which disk has not been obtained by use of a related art high stiffness single material containing an additive such as a filler or the like.

Further, a material having plate-like shape having a high aspect ratio may be added as a filler for increasing the stiffness so as to withstand stress deformation to the intermediate layer or core layer for enhancing its stiffness. The aspect ratio is a ratio of the length to the diameter of a filler, and the stiffness of a resin is dependent on the aspect ratio of a filler added to the resin. A resin to which a filler having a small aspect ratio, for example, a filler having spherical shape is added in a specific amount is lower in stiffness than the same resin to which a filler having a high aspect ratio, for example, a filler having plate-like shape is added in the same amount.

As a filler having a high aspect ratio, there are known a filler having plate-like shape and a filler in the form of fibers. The filler in the form of fibers, however, is undesirable because it has a high anisotropy. To be more specific, in the case of molding a disk substrate using a resin to which such a filler is added, the contraction ratio in the peripheral direction is made different from that in the radial direction, to inevitably cause propeller-shaped deformation of the substrate. As a result, it is desirable to add a filler of plate-like shape having a high aspect ratio and having a small anisotropy to the resin forming the core layer.

Examples of the fillers having a high aspect ratio are as follows:

|  | Plate-like glass | mica | talc | glass fiber (MF) |
|---|---|---|---|---|
| average length (L) | 40 | 40 | 2–3 | 25 |
| average diameter (D) | 5 | 0.5–0.8 | 0.2–0.3 | 9 |
| L/D | 6–9 | 50–80 | 6–9 | 2–3 |

In the above table, symbol L/D is an aspect ratio; L is an average length of a filler; D is a diameter of the filler; and MF is the abbreviation for milled fibers which are obtained by finely cutting fibers. In the case of molding a resin to which glass fibers or carbon fibers are added, the molding contraction in the radial direction is made different from that in the circumferential direction, to cause propeller-like deformation.

Further, for an information recording medium whose weight is reduced by using the intermediate layer or core layer made from a resin to which a filler such as a foam is added, it is possible to reduce a load applied to a spindle upon rotation of the medium.

While the preferred embodiments of the present invention have been described using specific terms, such description is for illustrative purposes only, and it is to be understood that changes and variations may be made without departing from the spirit or scope of the following claims.

What is claimed is:

1. A disk-like information recording medium, comprising:
   a substrate;
   a recording layer, provided on said substrate, for recording an information signal; and
   a light transmission layer laminated on said recording layer;
   wherein an information signal is recorded on said medium by making light incident on said medium from the light transmission layer side, wherein said substrate comprises:
      a core layer made from a resin; and
      a surface layer made from a resin and integrated with said core layer, said surface layer having on its one side plane information signals in the form of irregularities on the recording layer side and having a fluidity which is larger than that of said core layer where both said surface layer and said core layer are in a molten state at the same temperature, wherein said resin forming said surface layer of said substrate is a resin having a water absorption ratio of less than substantially 0.3%.

2. An information recording medium according to claim 1, wherein said resin forming said surface layer of said substrate is a resin having a water absorption ratio of less than substantially 0.1%.

3. An information recording medium according to claim 1, wherein said resin forming said core layer of said substrate is a vibration damping resin for suppressing a resonance phenomenon caused upon rotation of said information recording medium.

4. An information recording medium according to claim 3, wherein said vibration damping resin is a composite material containing a polymer and a filler.

5. An information recording medium according to claim 1, wherein a material having plate-like shapes each having a high aspect ratio is added as a filler to said resin forming said core layer of said substrate.

6. An information recording medium according to claim 1, wherein a filler in the form of hollow or foam bodies is added to said resin forming said core layer of said substrate.

7. An information recording medium according to claim 1, wherein said light transmission layer is a sheet made from a photo-curing resin or an optical transparent resin.

8. An information recording medium according to claim 1, wherein said resin forming said core layer is a mixture obtained by adding a filler imparting both a stiffness characteristic and a vibration damping characteristic to a resin identical to or different from said resin forming said surface layer.

9. An information recording medium according to claim 1, wherein said surface layer and said core layer are laminated to each other by simultaneously injecting molding said surface layer and said core layer, wherein information signals in the form of irregularities are transferred on one side plane of said surface layer.

10. An information recording medium according to claim 1, wherein said surface layer comprises:
    a first surface layer formed on a first side plane of said core layer and having information signals in the form of irregularities on the recording layer side; and
    a second surface layer formed on a second side plane of said core layer.

* * * * *